United States Patent
Sauer et al.

(10) Patent No.: US 11,716,251 B2
(45) Date of Patent: Aug. 1, 2023

(54) COMMUNICATION SYSTEM, PROVIDER NODE, COMMUNICATION NODE, AND METHOD FOR PROVIDING A VIRTUAL NETWORK FUNCTION TO A CUSTOMER NODE

(71) Applicant: Siemens Aktiengesellschaft, Munich (DE)

(72) Inventors: Markus Sauer, Munich (DE); Florian Zeiger, Höhenkirchen-Siegertsbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/260,425

(22) PCT Filed: May 16, 2019

(86) PCT No.: PCT/EP2019/062562
§ 371 (c)(1),
(2) Date: Jan. 14, 2021

(87) PCT Pub. No.: WO2020/030311
PCT Pub. Date: Feb. 13, 2020

(65) Prior Publication Data
US 2021/0314224 A1    Oct. 7, 2021

(30) Foreign Application Priority Data
Aug. 7, 2018   (EP) .................................... 18187722

(51) Int. Cl.
*H04L 41/084*   (2022.01)
*H04L 41/0853*   (2022.01)
(Continued)

(52) U.S. Cl.
CPC ...... *H04L 41/0846* (2013.01); *H04L 41/0843* (2013.01); *H04L 41/0853* (2013.01); *H04L 41/5048* (2013.01); *H04L 67/1097* (2013.01)

(58) Field of Classification Search
CPC ... H04L 41/08; H04L 41/0803; H04L 41/084; H04L 41/0843; H04L 41/0846;
(Continued)

(56) References Cited

U.S. PATENT DOCUMENTS 6,085,171 A * 7/2000 Leonard .............. H04L 41/5045
235/375
9,760,428 B1    9/2017 Felstaine
(Continued)

FOREIGN PATENT DOCUMENTS

| | | |
|---|---|---|
| CN | 102334111 A | 1/2012 |
| EP | 2414960 A1 | 2/2012 |
| WO | 2017028317 A1 | 2/2017 |

OTHER PUBLICATIONS

M. Kourtis et al., "T-NOVA: An Open-Source MANO Stack for NFV Infrastructures," in IEEE Transactions on Network and Service Management, vol. 14, No. 3, pp. 586-602, Sep. 2017 (Year: 2017).*

(Continued)

*Primary Examiner* — Vivek Srivastava
*Assistant Examiner* — William C McBeth
(74) *Attorney, Agent, or Firm* — Lempia Summerfield Katz LLC

(57) ABSTRACT

The disclosure is directed to providing virtual network functions to a customer node by a communication system with a provider node in an automatic, traceable, and auditable way. The provider node includes a retrieving module, a validation module, and a deployment module. The retrieving module is configured to retrieve a notification signal,
(Continued)

wherein the notification signal is indicative of a selected one of a plurality of virtual network functions and the customer node. The validation module is configured to establish service level agreement data and to validate the agreement service level data, based on the notification signal. The deployment module is configured to selectively transmit a deployment signal to a communication node depending on the validation of the service level agreement data for providing the selected virtual network function to the customer node.

15 Claims, 6 Drawing Sheets

(51) Int. Cl.
  *H04L 41/5041* (2022.01)
  *H04L 67/1097* (2022.01)
(58) Field of Classification Search
  CPC ............... H04L 41/085; H04L 41/0853; H04L 41/0866; H04L 41/0869; H04L 41/18; H04L 41/50; H04L 41/5003; H04L 41/5006; H04L 41/5041; H04L 41/5045; H04L 41/5048; H04L 41/5054; H04L 41/5096
  See application file for complete search history.

(56) References Cited

U.S. PATENT DOCUMENTS

| | | | | |
|---|---|---|---|---|
| 10,931,526 | B1* | 2/2021 | Jiang | ..................... H04L 41/082 |
| 2010/0246443 | A1 | 9/2010 | Cohn et al. | |
| 2013/0007272 | A1* | 1/2013 | Breitgand | ............. G06F 9/5077 709/224 |
| 2014/0317293 | A1 | 10/2014 | Shatzkamer | |
| 2015/0082308 | A1* | 3/2015 | Kiess | ................... G06F 9/45558 718/1 |
| 2015/0326448 | A1* | 11/2015 | Chaudhary | ......... H04L 41/5054 705/40 |
| 2015/0326451 | A1* | 11/2015 | Rao | ..................... H04L 41/5054 705/34 |
| 2016/0057075 | A1 | 2/2016 | Parikh et al. | |
| 2016/0182345 | A1 | 6/2016 | Herdrich et al. | |
| 2016/0212016 | A1* | 7/2016 | Vrzic | ................... H04L 41/5051 |
| 2017/0093750 | A1* | 3/2017 | McBride | ............... H04L 47/805 |
| 2017/0279923 | A1* | 9/2017 | Kumar | ................ H04L 41/0896 |
| 2017/0300696 | A1* | 10/2017 | Qin | ......................... G06F 21/64 |
| 2017/0346704 | A1* | 11/2017 | Strijkers | ............. H04L 41/5054 |
| 2018/0070262 | A1 | 3/2018 | Nakano | |
| 2018/0139107 | A1* | 5/2018 | Senarath | ............. H04L 41/5003 |
| 2018/0309646 | A1* | 10/2018 | Mustafiz | ............. H04L 41/5054 |
| 2018/0332485 | A1* | 11/2018 | Senarath | ............. H04L 41/5041 |
| 2018/0337931 | A1* | 11/2018 | Hermoni | ............. H04L 41/5051 |
| 2018/0367418 | A1* | 12/2018 | Dravid | ................ H04L 41/5054 |
| 2019/0109768 | A1* | 4/2019 | Senarath | ............. H04L 41/5006 |
| 2019/0174322 | A1* | 6/2019 | Deviprasad | ......... H04L 41/5051 |
| 2019/0199597 | A1* | 6/2019 | Valisammagari | ... H04L 41/5045 |
| 2019/0386886 | A1* | 12/2019 | Saxena | ............... H04L 41/5048 |
| 2021/0288827 | A1* | 9/2021 | Celozzi | ............... H04L 41/5003 |

OTHER PUBLICATIONS

Riera, Jordi Ferrer, et al. "TeNOR: Steps towards an orchestration platform for multi-PoP NFV deployment." 2016 IEEE NetSoft Conference and Workshops (NetSoft). IEEE, 2016. (Year: 2016).*

Kong, Jian, et al. "Guaranteed-availability network function virtualization with network protection and VNF replication." GLOBECOM 2017-2017 IEEE Global Communications Conference. IEEE, 2017. (Year: 2017).*

Mustafiz, Sadaf, et al. "A network service design and deployment process for NFV systems." 2016 IEEE 15th International Symposium on Network Computing and Applications (NCA). IEEE, 2016. (Year: 2016).*

ETSI Draft "Network Functions Virtualisation (NFV); Management and Orchestration", ETSI Draft; ETSI GS NFV-MAN 001, European Telecommunications Standards Institute (ETSI), 650, Route Des Lucioles; F-06921 Sophia-Antipolis ; France vol. ISG - NFV, No. V-MAN 001 VI.1.1 Sep. 30, 2017, pp. 1-184.

Huawei Technologies (UK): "Security Requirements on VNF Package; NFVSEC(15)000136 Security Requirement on VNF Package"; ETST Draft; NFVSEC(15)000136 Security Requirement on V NF Package, European Telecommunications—Standards Institute (ETSI), 650, Route Des Lucioles ; F-06921 Sophia-Antipolis; France, vol. ISG - NFV, May 14, 2015 pp. 1-5.

International Search Report and the Written Opinion for International Patent Application PCT/EP2019/062562 dated Jul. 16, 2019.

* cited by examiner

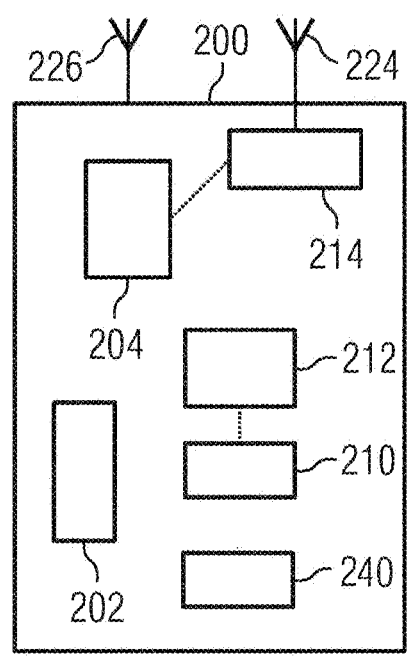

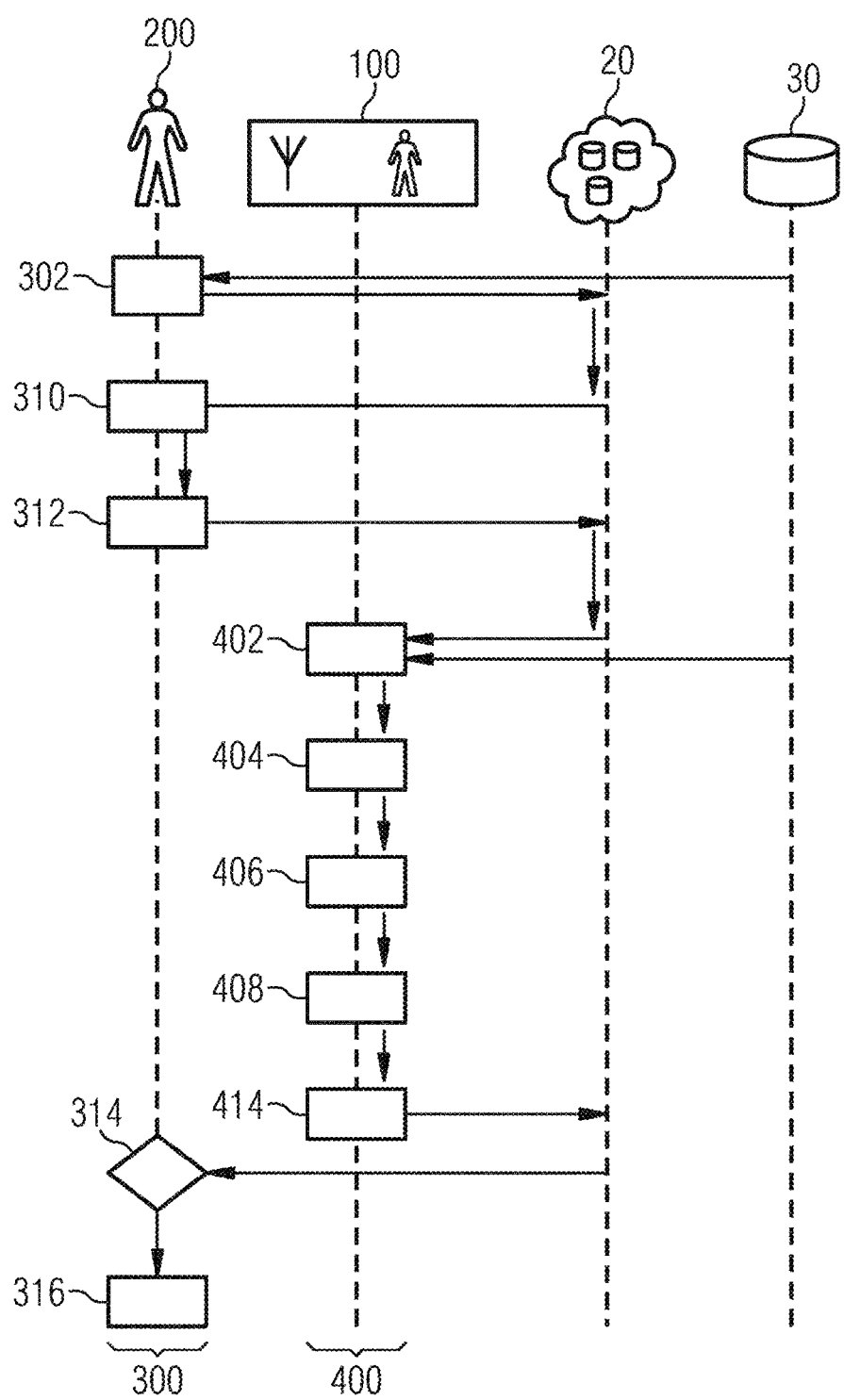

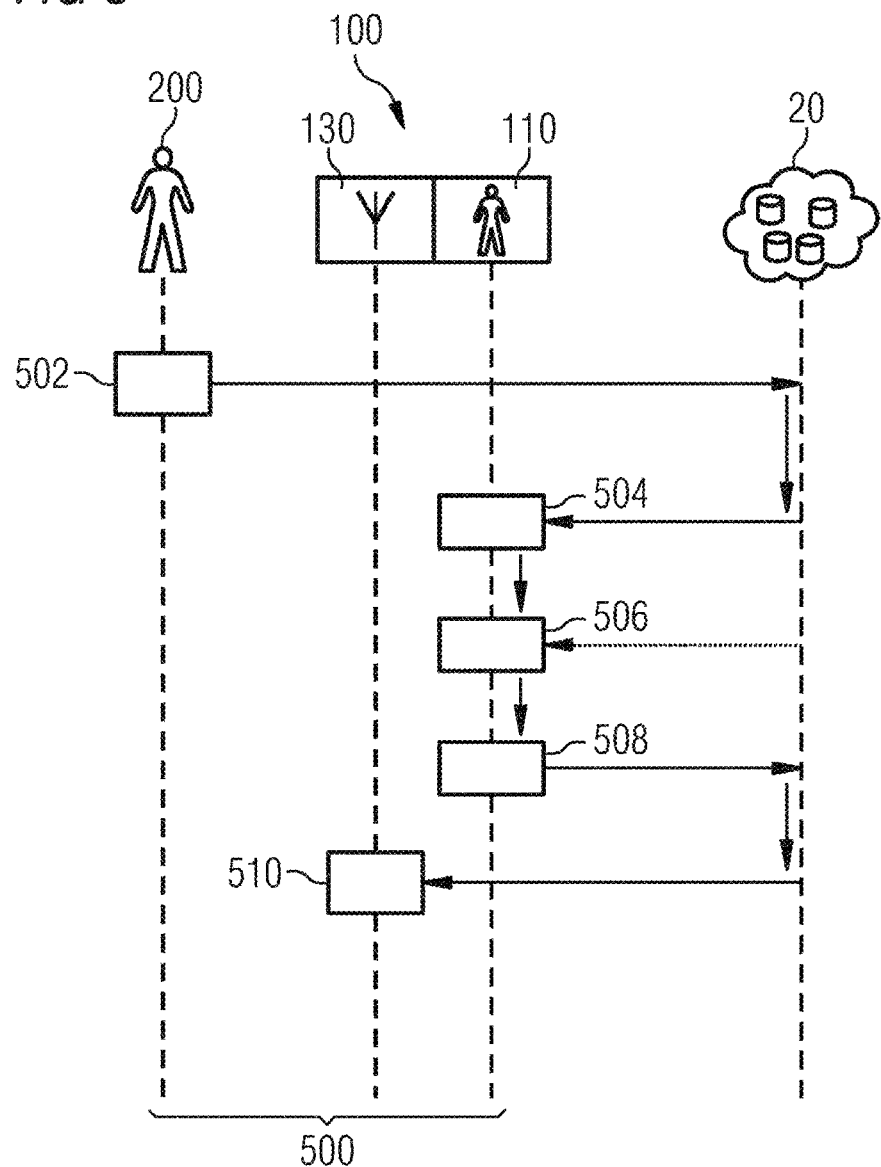

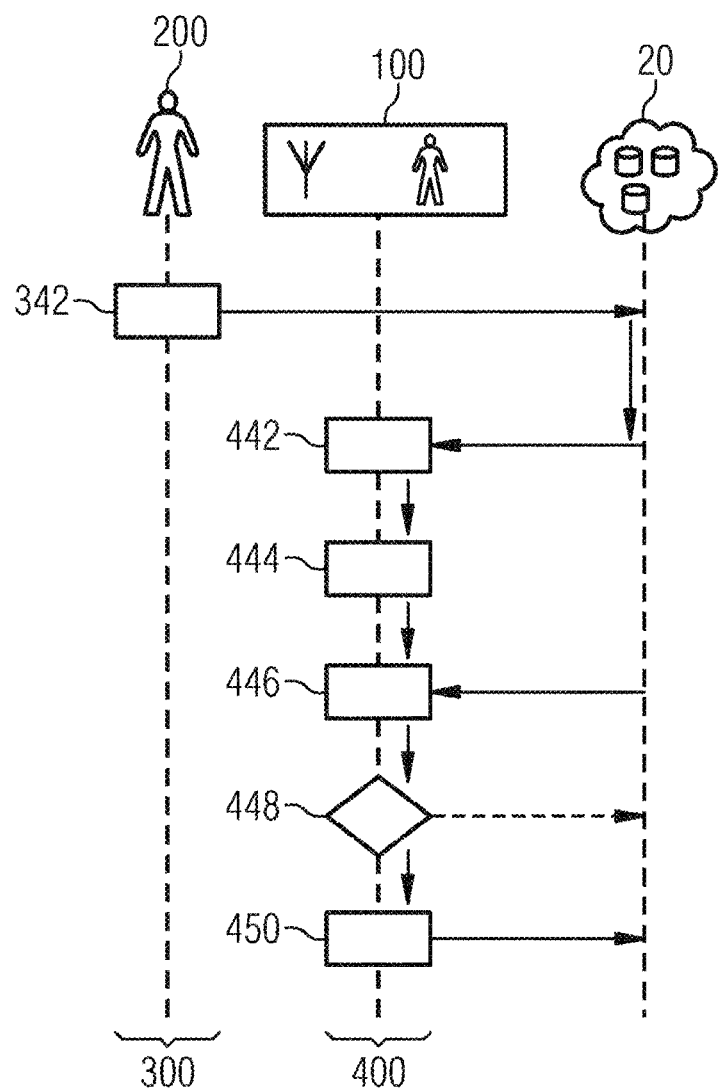

COMMUNICATION SYSTEM, PROVIDER NODE, COMMUNICATION NODE, AND METHOD FOR PROVIDING A VIRTUAL NETWORK FUNCTION TO A CUSTOMER NODE

The present patent document is a § 371 nationalization of PCT Application Serial No. PCT/EP2019/062562, filed May 16, 2019, designating the United States, which is hereby incorporated by reference, and this patent document also claims the benefit of European Patent Application No. 18187722.6, filed Aug. 7, 2018, which is also hereby incorporated by reference.

TECHNICAL FIELD

The disclosure relates to the field of data networks and their configuration, and more particularly is directed to a provider node, a communication node, a communication system, and a method for providing a plurality of virtual network functions to a customer node as well as a respective customer node and a method for operating such a customer node.

BACKGROUND

Exchanging data between a plurality of computational devices may be based on a physical transfer of such data or on a data network. Such a data network may be a local network, a wide area network or a global network such as the Internet. Moreover, such a data network may be—at least partially—based on wireless data connections, thus forming a mobile network and enabling mobile communication, or based on wired connections. The computational devices connected to each other via a data network may also be called nodes of the data network. A customer node, (e.g., a user equipment or mobile terminal or industrial control device or industrial machine or Internet-of-things device), may access and/or connect to the data network via one or more network functions provided to the customer node by the data network.

The customer node may use some of the network functions for exchanging data with other nodes of the data network. The data network may provide the network functions by one or more communication systems, which implement some or all of the provided network functions. In particular, the data network may provide several functions and parameters to the customer node, such as a data transfer function, a channel for voice transmission, a function for configuring communication nodes, a communication service management function and their respective parameters, as well as several parameters defining a state, mode, or setup of the data network, and/or the customer node, e.g., communication protocols, data transfer rates, an address space of the data network, an address of the customer node and/or physical configurations or layers of the data network.

Moreover, some or all of the network functions may be virtualized, and hence be implemented as virtual network functions, which in particular facilitates providing, configuring, and adjusting network functions. Virtual network functions may offer a high flexibility in the definition of industrial communication services as the specific network functions are virtualized, and hence not directly linked to a specific network or communication hardware.

For industrial communication services the virtual network functions, their functional specifications, the customer nodes which are provided with the virtual network functions and further agreements between a service provider providing these virtual network functions and a customer using these network functions may be defined in a written contract. According to this written contract, the provider may set up the virtual network functions and the customer may use the virtual network functions provided by the provider by one or more customer nodes.

SUMMARY AND DESCRIPTION

There is a demand to facilitate providing and using virtual network functions, and more particular to activate, configure, and deactivate virtual network functions in a traceable and/or auditable manner.

This demand is met by a provider node, a communication node, a communication system, a validating provider node, a customer node, a method for operating a customer node, and by a method for providing a plurality of virtual network functions to a customer node by a communication system, as disclosed herein. The scope of the present disclosure is defined solely by the appended claims and is not affected to any degree by the statements within this summary. The present embodiments may obviate one or more of the drawbacks or limitations in the related art.

A first aspect of the disclosure is directed to a provider node. The provider node includes a retrieving module, a validation module, and a deployment module. The retrieving module is configured to retrieve a notification signal, the notification signal being indicative of a selected one of a plurality of virtual network functions and at least one customer node to which the selected virtual network function is to be provided. Furthermore, the retrieving module is configured to retrieve, from a trusted database or a data repository system, at least one of a configuration of the selected virtual network function and a template of the selected virtual network function. The validation module is configured to establish service level agreement data, the service level agreement data at least representing the configuration of the selected virtual network function and the at least one customer node. The deployment module is configured to establish a deployment signal based on the service level agreement data and the template of the selected virtual network function. Furthermore, the deployment module is configured to transmit the deployment signal to a communication node for providing the selected virtual network function to the at least one customer node.

Within the meaning of the present disclosure, a "trusted database" may refer to a distributed database or to a database provided by a trusted third-party. Moreover, a trusted database may—in particular in a single user/customer scenario—also refer to a generic database such as a relational database, to which only a restricted number of customers have access, in particular writing access, whereby trust into this database is provided.

Some embodiments, which validate the service level agreement data based on hardware requirements and/or functional parameters for providing the selected virtual network function, may have the advantage that the availability of the selected virtual network function may be guaranteed. Besides using hardware requirements or functional parameters from the notification signal, a system configuration of the communication node or a communication system including the communication node may be used for validating. In some further improvements, the system configuration includes a physical specification or guaranteed availability data or both, wherein the physical specification specifies physical capabilities and/or hardware of the communication node or a communication system including the communication node, and wherein the guaranteed availability data is indicative of one or more further virtual network functions being available and being guaranteed to be available to the customer node or one or more further customer nodes.

A further aspect of the present disclosure is directed to a provider node. The provider node includes a retrieving module, a validation module, and a deployment module. The retrieving module is configured to retrieve a notification signal, wherein the notification signal is indicative of a selected one of a plurality of virtual network functions and at least one customer node to which the selected virtual network function is to be provided. The validation module is configured to establish service level agreement data, wherein the service level agreement data is at least representing a configuration of the selected virtual network function and the at least one customer node, and to validate the service level agreement data, based on the notification signal. The deployment module is configured to selectively transmit a deployment signal to a communication node depending on the validation of the service level agreement data for providing the selected virtual network function to the at least one customer node, wherein the deployment signal is indicative of the at least one customer node, the selected virtual network function, and its configuration.

The embodiments, advantageous modifications, and further improvements as already described in detail above in connection with the first aspect as well as potential benefits and advantages also apply correspondingly to the provider node according to the further aspect.

Within the meaning of the present disclosure, a "virtual network function" may refer to a software implementation of a network function. Such a virtual network function may run on a communication system adapted for providing virtual network functions and may be deployed on such a communication system. The communication system may include one or more communication nodes, wherein the virtual network function to be deployed on the communication system runs as a software implementation on one or more of these nodes, in particular instead of having custom hardware devices for each network function. More specifically, a virtual network function may be one of a firewall, an intrusion detection device, a load balancer, a control channel, a data channel, and a data connection between at least two nodes of a data network.

As disclosed herein, "service level agreement data" at least represents a configuration of a virtual network function and at least one customer node. Moreover, the service level agreement data may specify certain hardware requirements and/or agreements, identifiers of selected virtual network functions, and/or certain functional parameters, which may have been agreed upon between a provider and a customer. Such hardware requirements may include transfer rates, digital bandwidth capacity, latency, a level of redundancy, and/or a location of communication nodes and/or customer nodes, which may exchange data via a virtual network function. Such functional parameters may include address spaces, port ranges or ports, data handling or filtering capacity for data traffic over virtual network functions, logical configurations of a data network, and/or computing capacity or memory capacity for the virtual network functions. Furthermore, the preceding specifications may be allocated to one or more service levels, which may differ in terms of the preceding specifications.

An advantage of the validation module may particularly be that the service level agreement data may be established and validated by the validation module, thus making it possible for a provider and a customer to automatically agree on the service level agreement data by a provider node and a customer node, whereby providing virtual network functions to the customer node is facilitated. Moreover, retrieving the notification signal and deploying the selected virtual network function—after the validating—allows automatically deploying virtual network functions. Thereby, virtual network functions may be activated or deactivated on demand based on respective notification signals, in particular without human interaction. Due to the automatic establishing of the service level agreement data a plurality of virtual network functions, specified by respective service level agreement data, may be offered by one or more providers (e.g., via their respective provider nodes) and/or may be used by one or more users or customers (e.g., by their customer nodes), wherein the virtual network functions, their implementation and/or the respective service level agreement data may be shared between the providers and/or the users, instead of individual service level agreements, which may require a written contract, and thus may be time-consuming, and/or which may be less optimized due to their individual nature.

According to some embodiments, the provider node may be configured to selectively send one or more deployment signals to one or more additional communication nodes for providing the selected virtual network function depending on the validation of the service level agreement data. This may beneficially allowed to provide virtual network functions, which may require more than one communication node, e.g., the communication node and one of the further communication nodes.

According to some embodiments the retrieving module is configured to retrieve at least one of the notification signal and the service level agreement data from a distributed database.

As disclosed herein, a "distributed database" is a database that is distributed over a multitude of computational nodes, wherein transactions to the database depend on a consensus between the computational nodes, and wherein the computational nodes may be geographically spread across multiple sites, locations, countries, or organizations. Such a consensus may be established by a consensus algorithm like proof of work, proof of stake or a voting system. In particular, the distributed database may be implemented as a blockchain.

An advantage of retrieving the notification signal or the service level agreement data from the distributed database may particularly be that a request for the selected virtual network function—e.g., the notification signal—and the customer node as well as parameters for the selected virtual network functions—such as the configuration of the selected virtual network function—are stored, and thus recorded, in the distributed database, which allows validating deployment of virtual network functions and/or correspondence to the expectations of the customers and providers. Moreover, this may enable the management of virtual network functions associated to a customer—e.g., one or more customer nodes associated with the customer—in a controlled and transparent fashion. Hence, the request for and the deployment of the selected virtual network function may be accounted to a specific customer and/or the specific requirements for the selected virtual network functions—e.g., as specified in the service level agreement data—may be auditable and traceable.

In some embodiments, in which the retrieving module is configured to be connected to a distributed database, the retrieving module is further configured to retrieve, from the distributed database, at least one of the configuration of the selected virtual network function and a template of the selected virtual network function.

As disclosed herein, a "template of a virtual network function" is an abstract implementation of the virtual network function, e.g., a virtualized network function, such as a computer program, wherein for providing the virtual network function the template is to be combined with a configuration of the virtual network function and/or is to be instantiated on a computational node—such as a communication node—for running this virtual network function.

An advantage of retrieving the configuration or the template of the selected virtual network function from the distributed database may particularly be that the configuration and/or the template of the selected virtual network function is stored in the distributed database, whereby an audit trail for the selected virtual network function, its management and/or its accounting may be improved. Moreover, this may advantageously provide that the requested virtual network function—e.g., the selected virtual network function—corresponds to the expectation of the customer.

According to some embodiments, the retrieving module is further configured to retrieve from a data repository system at least one of the configuration of the selected virtual network function and a template of the virtual network function. Thereby, the configuration and/or the template of the selected virtual network function may be stored in the data repository system, which may facilitate the distribution of the virtual network function (e.g., its configuration and/or its template) and/or render the transfer of the required data and/or the storage of the data more efficient.

In some advantageous modifications the configuration of the selected virtual network function is stored in and retrieved from the data repository system and an identifier (e.g., a hash value or a unique name/number/code/key) of the configuration is stored in and retrieved from the distributed database. Accordingly, in some advantageous modifications the template of the selected virtual network function may be stored in the data repository system and an identifier of it is stored in the distributed database. In this beneficial way, the auditability and/or the traceability of requests for the selected virtual network function may be improved, while enabling an efficient storage and retrieval of the respective complete data (e.g., the configuration or the template).

An advantage of storing the configuration and/or the template of virtual network functions (e.g., of the selected virtual network function) in the distributed database and/or the data repository system may particularly be that the configuration and/or the template may be used by multiple users or customers and/or may be offered by multiple providers, whereby an ecosystem of virtual network functions, which are provided (e.g., on demand) by multiple providers to multiple users, may be established.

In some embodiments, in which the configuration or the template of the selected virtual network function is stored in a distributed database or a data repository system, the configuration and/or the template may be stored in an encrypted form. Thereby, the configuration and/or the template is protected from unauthorized entities.

In some embodiments, in which the configuration or the template is stored in a distributed database or a data repository system, the configuration and/or the template is stored in an unencrypted format. Thereby, virtual network functions (e.g., the selected virtual network function) and the configuration and/or the template may be shared in an open ecosystem, were not only agreements between customers and providers may be realized in a highly dynamic way, but also new customers or providers (e.g., new stakeholders) may be onboarded dynamically.

In some embodiments, in which the notification signal is retrieved from a distributed database, the notification signal is further indicative of a smart contract stored in the distributed database. The smart contract authorizes to transfer a certain amount of cryptocurrency of a customer account (e.g., associated with the at least one customer node) to another account (e.g., associated with the provider and/or the provider node). Furthermore, the validating of the service level agreement data further includes comparing the certain amount with a predetermined value. Thereby, an inherent audit trail may be provided and/or the providing of the selected virtual network function and the accounting of the deployment of the selected virtual network function may be facilitated.

In some embodiments, in which the template of the selected virtual network function is retrieved from a distributed database or a data repository system, the validation module is configured to validate the service level agreement data based on the notification signal and the template of the selected virtual network function. Thereby, the validating may be further improved.

In some embodiments, in which the template of the selected virtual network function is retrieved from a distributed database or a data repository system, the deployment module is configured to establish the deployment signal based on the service level agreement data and the template of the selected virtual network function. In this advantageous way, the deployment signal may include all data which is relevant for providing the selected virtual network function, which may enable the communication node to provide the selected virtual network function based on the deployment signal without additional/further access to other resources, whereby providing the selected virtual network function may be rendered more efficient.

In some embodiments, in which the template of the selected virtual network function is stored in a distributed database or a data repository system, the deployment module is configured to establish the deployment signal based on the service level agreement data and an identifier of the selected virtual network function. Thereby, the size of the deployment signal may be reduced compared to a deployment signal including the template of the virtual network function, which may render the transfer of the deployment signal more efficient.

As disclosed herein, a "data repository system" is a computational system for storing data, in particular a template and/or a configuration of one or more virtual network functions. The data repository system may be implemented as a database, a storage server, or a cloud storage or other storing data.

According to some embodiments the notification signal, the service level agreement data, the configuration of the selected network function and/or a template of the selected virtual network function are digitally signed. Digital signing may facilitate the verification and/or validation. This may be particularly beneficial for an open ecosystem, in which virtual network functions are provided by multiple providers and/or to multiple users.

A second aspect of the disclosure is directed to a communication node. The communication node includes a receiving module and a management module. The receiving module is configured to receive a deployment signal indicative of at least one customer node, a selected one of a plurality of virtual network functions, and a configuration of the selected virtual network function, and in particular a template of the selected virtual network function. The management module is configured to provide the selected virtual network function according to its configuration to the at least one customer node. In particular, the management module is adapted, for providing the selected virtual network function, to instantiate the selected virtual network function based on the template and the configuration of the selected virtual network function.

The embodiments, advantageous modifications and further improvements as already described in detail above in connection with the first aspect and the further aspect as well as potential benefits and advantages also apply correspondingly to the communication node.

According to an embodiment, the communication node further includes a state reporting module. The state reporting module is configured to determine status report data, wherein the status report data is indicative of whether the selected virtual network function and according to which configuration is provided to the at least one customer node. Furthermore, the state reporting module is configured to transmit the status report data to a distributed database.

According to some embodiments a trusted oracle includes a respective state reporting module.

An advantage of state reporting may particularly be that the actual status of the selected virtual network function is stored in the distributed database based on one or more sources, such as the communication node or the trusted oracle (and may be cryptographically signed by a private key), whereby traceability and/or auditability may be further improved.

According to some embodiments the communication node further includes a retrieving module, wherein the retrieving module is configured to retrieve a template of the selected virtual network function from a data repository system. Furthermore, the management module is adapted, for providing the selected virtual network function, to instantiate the selected virtual network function based on the template and the configuration of the selected virtual network function. In some advantageous modifications, the template may be retrieved based on an identifier of the selected virtual network function (e.g., a hash value or a unique name/number/code/key), wherein in particular the deployment signal may include the identifier.

A third aspect of the disclosure is directed to a communication system including the provider node according to the first or second aspect or the further aspect and the communication node according to the second aspect.

The embodiments, advantageous modifications, and further improvements as already described above in detail in connection with the preceding numbered or further aspects of the disclosure as well as potential benefits and advantages also apply to the communication system, correspondingly.

According to some embodiments, the deployment module of the provider node is further configured to transmit the deployment signal to the factory node. Moreover, the factory node is configured to retrieve the template of the selected virtual network function from the data repository system and at least one of the configuration of the selected virtual network function, the service level agreement data, an indication of the selected virtual network function, an indication of the communication node, and an indication of the at least one customer node from the trusted database. Furthermore, the factory node is further configured to generate a runnable instance of the selected virtual network function based on the template and configuration of the selected virtual network function, based on the indication of the selected virtual network function, the at least one customer node, and the communication node, and/or based on the service level agreement data. Moreover, the retrieving module of the communication node is configured to retrieve the runnable instance. Moreover, the management module of the communication node is configured to instantiate the selected virtual network function based on the runnable instance. An advantage of the factory node may be, that securing mechanisms such as signing the runnable instance may be implemented and/or that creating/generating the runnable instance may be performed by a trusted entity, (e.g., the factory node), which may be owned/controlled by the owner of the communication system. This may beneficially facilitate checking the instantiated virtual network functions, e.g., by limiting possible instantiations to instances provided by the factory node. Otherwise functional tests of running virtual network functions may be performed, which may require more resources.

A fourth aspect of the disclosure is directed to a customer node for a data network, wherein the data network is adapted for providing a plurality of virtual network functions to the customer node by a communication system. The customer node includes a selecting module, a reporting module, and a communication module. The selecting module is configured to select one of the plurality of virtual network functions as a selected virtual network function. The reporting module is configured to report the selected virtual network function to a distributed database. The communication module is configured to establish a data communication via the selected virtual network function when it is provided by the communication system. Furthermore, the customer node may include an obtaining module configured to receive availability data from a trusted database or a data repository system, the availability data being indicative of the one or more virtual network functions being available to the customer node, wherein the selecting module is configured to select one of the available virtual network functions, which are available according to the availability data.

The embodiments, advantageous modifications, and further improvements as already described in detail above in connection with the preceding numbered or further aspects as well as potential benefits and advantages also apply correspondingly to the customer node.

According to some embodiments, the availability data may include the guaranteed availability data. When the availability data includes data that is indicative of the one or more virtual network functions being available to the customer node or to further customer nodes but whose availability is not guaranteed, a best effort approach for providing virtual network functions being available but not being guaranteed may beneficially be combined with a guaranteed availability approach, wherein the guaranteed availability approach is based on the guaranteed availability data. Thereby, availability of virtual network functions for critical operations (e.g., for an industrial production system) may be guaranteed by the guaranteed availability approach, whereas remaining resources of the communication system may be used by the best effort approach for other virtual network functions, which are not critical, e.g., for operation of the industrial production system.

According to some embodiments, the customer node further includes an obtaining module. The obtaining module is configured to receive availability data from the distributed database or a data repository system, wherein the availability data is indicative of the one or more virtual network functions being available to the customer node. Thereby, the virtual network functions may be shared between multiple providers/provider nodes and customers/customer nodes, wherein some or all of the virtual network functions may be made available to a specific customer node (e.g., when it obtains these virtual network functions). In some advantageous modifications, a virtual network function, one or more configurations for a virtual network function, or a service level agreement including a virtual network function, one or more configurations or a combination thereof may be obtained by purchasing the specific virtual network function/configurations/service level agreement by a cryptocurrency based on the distributed database.

According to some embodiments, the reporting module or the obtaining module may be further configured to store a smart contract in the distributed database, wherein the smart contract is indicative of the selected virtual network function or a virtual network function to be obtained and an amount of cryptocurrency for the virtual network function and an authorization for transferring this amount of the cryptocurrency. Likewise, the smart contract may be indicative of one or more configurations of the selected virtual network function or a virtual network function to be obtained. Likewise, the smart contract may be indicative of a service level agreement including a virtual network function, one or more configurations of it, or a combination thereof. Thereby, obtaining, selecting and/or deploying/providing, and/or accounting virtual network functions/configurations/service level agreements may be fully automated. Furthermore, this automation and/or the amount of cryptocurrency spent by an automated process of obtaining/selecting virtual network functions may be limited by storing a predetermined amount of the cryptocurrency for this automation, which may alleviate potential technical and/or financial damages caused by a possible error, malfunction, or misconfiguration of the automation.

According to some embodiments, the customer node further includes a state reporting module, wherein the state reporting module is configured to determine status report data, which is indicative of whether the selected virtual network function and/or according to which configuration is provided by the communication system to the customer node, and to transmit the status report data to the distributed database.

A fifth aspect of the disclosure is directed to a validating provider node for a communication system. The validating provider node includes a retrieving module, a validation module, and a deployment module. The retrieving module is configured to retrieve an initial notification signal, the initial notification signal being indicative of a selected one of a plurality of virtual network functions, and at least one customer node to which the selected virtual network function is to be provided. The validation module is configured to establish service level agreement data, the service level agreement data at least representing a configuration of the selected virtual network function and the at least one customer node. Furthermore, the validation module is configured to establish validation data by validating the service level agreement data against a physical specification of the communication system. The deployment module is configured to selectively transmit an initial deployment signal depending on the validation data to a trusted database, wherein the initial deployment signal is being indicative of the service level agreement data and whether the communication system is, according to the physical specification, able to provide the selected virtual network function.

The embodiments, advantageous modifications, and further improvements as already described in detail above in connection with the preceding numbered or further aspects as well as potential benefits and advantages also apply correspondingly to the validating provider node.

An advantage of the validating the service level agreement data against the physical specification may particularly be, that—once validation is successful—the availability of the selected virtual network function may be guaranteed. This may particularly be different from best effort scenarios provided by other virtual network function implementations and their management.

According to some embodiments, the validation module is configured to establish validation data by validating the service level agreement data against a system configuration of the communication system, wherein the system configuration includes the physical specification of the communication system (in particular, specifying one or more communication nodes of the communication system and their capabilities) and availability data (in particular, guaranteed availability data). An advantage of the validating against the physical specification and the (e.g., guaranteed) availability data may be that, in addition to the principle capability of the communication system to provide the selected virtual network function, it may be provided that the communication system is really able to provide the selected virtual network function even when also providing the other (e.g., guaranteed) virtual network functions, in particular whose availability or a guaranteed availability is indicated by the (e.g., guaranteed) availability data.

According to some embodiments, the provider node of the first aspect of the disclosure may be implemented as a validating provider node. Thereby, deployment of the selected virtual network function may be synergistically combined with validating, and thus guaranteeing the selected virtual network function, whereby—in particular— once the virtual network function is validated and deployed, the customer/the customer node may rely on the (e.g., initial) deployment signal and use the virtual network function based on the deployment signal for critical operations such as a firmware updates or controlling a manufacturing process or an industrial production system. Moreover, in some embodiments, the validating, and the deployment both may beneficially increase reliability when activating, using, and/or deactivating the selected virtual network function and/or when providing the selected virtual network function, whereby—in particular—reliability, safety and/or security of an industrial production system including a customer node that uses the selected virtual network function for a critical operation may be enhanced.

A sixth aspect of the disclosure is directed to a method for operating a customer node for a data network, wherein the data network is adapted for providing a plurality of virtual network functions to the customer node by a communication system. In some advantageous modifications, the customer node may be according to the fourth aspect and/or the communication system may be according to the third aspect. The method includes selecting one of the plurality of virtual network functions as a selected virtual network function. Furthermore, in the method, the selected virtual network function is reported to a distributed database. Finally, a data communication is established via the selected virtual network function when it is provided by the communication system. Additionally, the method may include receiving availability data from a trusted database or a data repository system, the availability data being indicative of the one or more virtual network functions being available to the customer node, wherein the virtual network function is selected from the available virtual network functions.

The embodiments, advantageous modifications, and further improvements as already described in detail above in connection with the preceding numbered or further aspects as well as potential benefits and advantages also apply correspondingly to the method for operating a customer node.

A seventh aspect of the disclosure is directed to a method for providing a plurality of virtual network functions to a customer node by a communication system. The communication system may, in some advantageous modifications, be according to the third aspect and/or the customer node may be according to the fourth aspect. The method includes retrieving a notification signal, which is indicative of a selected one of the plurality of virtual network functions and at least one customer node to which the selected virtual network function is to be provided. Moreover, the method may include retrieving, from a trusted database or a data repository system, at least one of a configuration of the selected virtual network function and a template of the selected virtual network function. Furthermore, the method includes establishing service level agreement data, which is at least representing a configuration of the selected virtual network function and the at least one customer node, based on the notification signal. Moreover, in some modifications, the service level agreement data is validated based on the notification signal. Finally, in the method, the selected virtual network function is provided to the at least one customer node, e.g., according to the configuration of the selected virtual network function, wherein the selected virtual network function is provided by instantiating the selected virtual network function based on the template and the configuration of the selected virtual network function.

The embodiments, advantageous modifications, and further improvements as already described above in connection with the preceding numbered of further aspects as well as potential benefits and advantages also apply correspondingly to the method for providing a plurality of virtual network functions.

According to some embodiments, a virtual network function may be activated by selecting it, sending a respective notification signal, which results in transmitting a respective deployment signal, and finally providing the selected virtual network function.

According to some embodiments, a virtual network function may be deactivated by sending a respective notification signal, which then results in a respective deployment signal, and finally in stopping the providing of the virtual network function.

Likewise, the configuration of a virtual network function may be changed in some embodiments.

In some embodiments, sending the respective notification signals may be performed by storing the notification signal in a distributed database.

The above summary is merely intended to give a short overview over some features of some embodiments and implementations and is not to be construed as limiting. Other embodiments may include other features than the ones explained above.

BRIEF DESCRIPTION OF THE DRAWINGS

The above and other embodiments, advantageous modifications, further improvements, elements, features, acts, and characteristics of the present disclosure will be more apparent from the following detailed description of exemplary embodiments and the appended figures. When not stated otherwise or following otherwise from the context, like reference signs refer to corresponding apparatuses, elements or features of the exemplary embodiments and throughout the figures.

FIG. 3 schematically illustrates a customer node according to an embodiment.

FIG. 4 represents a flowchart of a method for activating a virtual network function according to an embodiment.

FIG. 5 represents a flowchart of a method for deactivating a virtual network function according to an embodiment.

FIG. 6 represents a flowchart of a method for initiating and validating a virtual network function according to an embodiment.

DETAILED DESCRIPTION

In the following, various embodiments of the disclosure will be described in detail with reference to the appended figures. It is to be understood that the following description of embodiments is not to be taken in a limiting sense. The scope is not intended to be limited by the embodiments described hereinafter or by the figures, which are taken to be illustrative only.

The figures are to be regarded as being schematic representations and elements illustrated in the figures, which are not necessarily shown to scale. Rather, the various elements are represented such that their function and their general purpose become apparent to a person skilled in the art. Any connection or coupling between functional blocks, devices, components or other physical or functional units shown in the figures or described herein may also be implemented by an indirect connection or coupling. A coupling between components may be established over a wireless connection. Functional blocks may be implemented in hardware, firmware, software, or a combination thereof.

Figure 1:
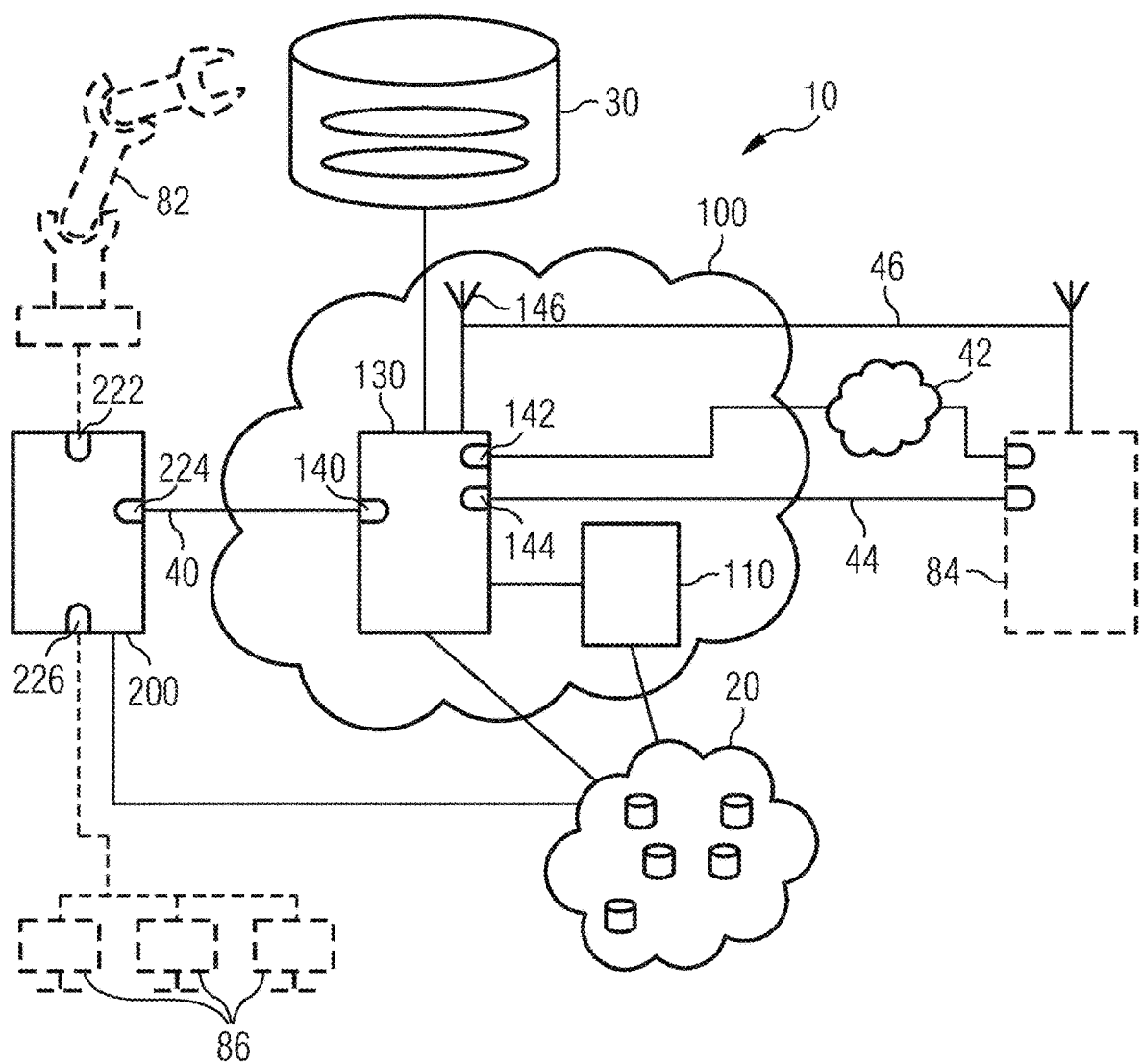
FIG. 1 schematically illustrates a data network with multiple different nodes according to an embodiment.

In FIG. 1, a data network 10, adapted for providing a plurality of virtual network functions, according to an embodiment is schematically illustrated.

In an exemplary embodiment, the data network includes a communication system 100 and a customer node 200. Furthermore, the data network 10 may include a distributed database 20 and a data repository system 30. Moreover, in some advantageous modifications, the data network 10 may also include a data node 84. It is to be understood, that some modifications may also not include one of the distributed database 20, the data repository system 30 and the data node 84.

In some advantageous modifications, the customer node 200 may be a component of an industrial production system.

Such an industrial production system may additionally include a production device 82 (e.g., a robot) and one or more computers 86, which are schematically shown in FIG. 1 for illustrative purposes, too. The customer node may include one or more network interfaces 222, 224, 226 for establishing data connections to the communication system 100, the production device 82, and/or the computers 86. Furthermore, the customer node 200 may be data connected to the distributed database 20.

The communication system 100 includes a provider node 110 and a communication node 130. The provider node 110 is data connected to the distributed database 20 and the communication node 130. The communication node 130 is data connected to the distributed database 20, the data repository system 30 and the provider node 110. Moreover, the communication node 130 may include one or more network interfaces 140, 142, 144, 146. Some of the network interfaces may be implemented for wired connections (e.g., point-to-point connections over a line) and/or some of the network interfaces may be implemented for wireless connections (e.g., by a radio interface).

In some advantageous modifications, the communication system 100 may include one or more additional communication nodes, which may be similar or equal to the communication node 130.

The network interface 140 is configured to be connected to the network interface 224 over a network connection 40, which may be implemented as a wired connection, in particular a point-to-point connection.

In some advantageous modifications, the data node 84 may be adapted for providing a firmware update to the customer node and/or for backing up data sent by the customer node 200. The data node 84 includes one or more network interfaces, such that the communication node 130 may establish one or more data connections. In some advantageous modifications, the communication node 130 may be configured to establish multiple data connections to the data node 84, which may facilitate a guaranteed data transfer rate or uptime. As illustrated in FIG. 1, the network interface 142 may be data connected to the data node 84 via the Internet 42. Additionally or alternatively a data connection 44 (e.g., a wired point-to-point data connection) may be established from the network interface 144 to the data node 84. Additionally or alternatively the network interface 146 may be configured to establish a wireless data connection 46 to the data node 84.

The establishing of the data connections 44, 46 or via the Internet 42 is implemented by a virtual network function. This virtual network function may also specify the required level of redundancy (e.g., using more than one of the data connections 42, 44, and/or 46).

In one advantageous application, the customer node 200 may select such a virtual network function, which provides data connections via the Internet 42, for backing up the computers 86, wherein data from the computers 86 is transferred via the customer node and the data connection to the data node 84. The data connection via the Internet 42 may beneficially provide a high data rate and/or a low cost for transferring the data.

Additionally, or alternatively, the customer node may select such a virtual network function, which provides data connections via a virtual private network or a tunnel by a point-to-point connection between two endpoints or the Tenant net. In some advantageous modifications, applications and the benefits may be similar to using a connection via the Internet.

Additionally, or alternatively, the customer node may select such a virtual network function, which specifies redundancy and one connection by a point-to-point wired connection, (e.g., data connection 44), and a wireless data connection such as data connection 46, for applying a firmware update to the production device 86, which may be provided by the data node 84. The redundant data connections and, in particular, point-to-point connections may beneficially allow to guarantee an uninterrupted and/or fast firmware update of the production device 82. Likewise such a redundant data connection may be used for controlling the production device 82, in particular from a remote site, with low latency and/or a high uptime and/or low risk of interruption.

In some advantageous modifications, the customer node 200 and the data node 84 may be geographically separated and/or may be installed at different sites.

In some advantageous modifications, the customer node 200 may be configured to automatically request such a virtual network function (e.g., as a selected a virtual network function) in order to perform a backup or a firmware update. Thereby, no human interaction is required for performing the respective tasks, (e.g., a backup or a firmware update). Furthermore, by reporting the selected virtual network function to the distributed database 20, certain requirements and specifications required for the respective task may be guaranteed, in particular, in terms of the selected virtual network function.

Figure 2:
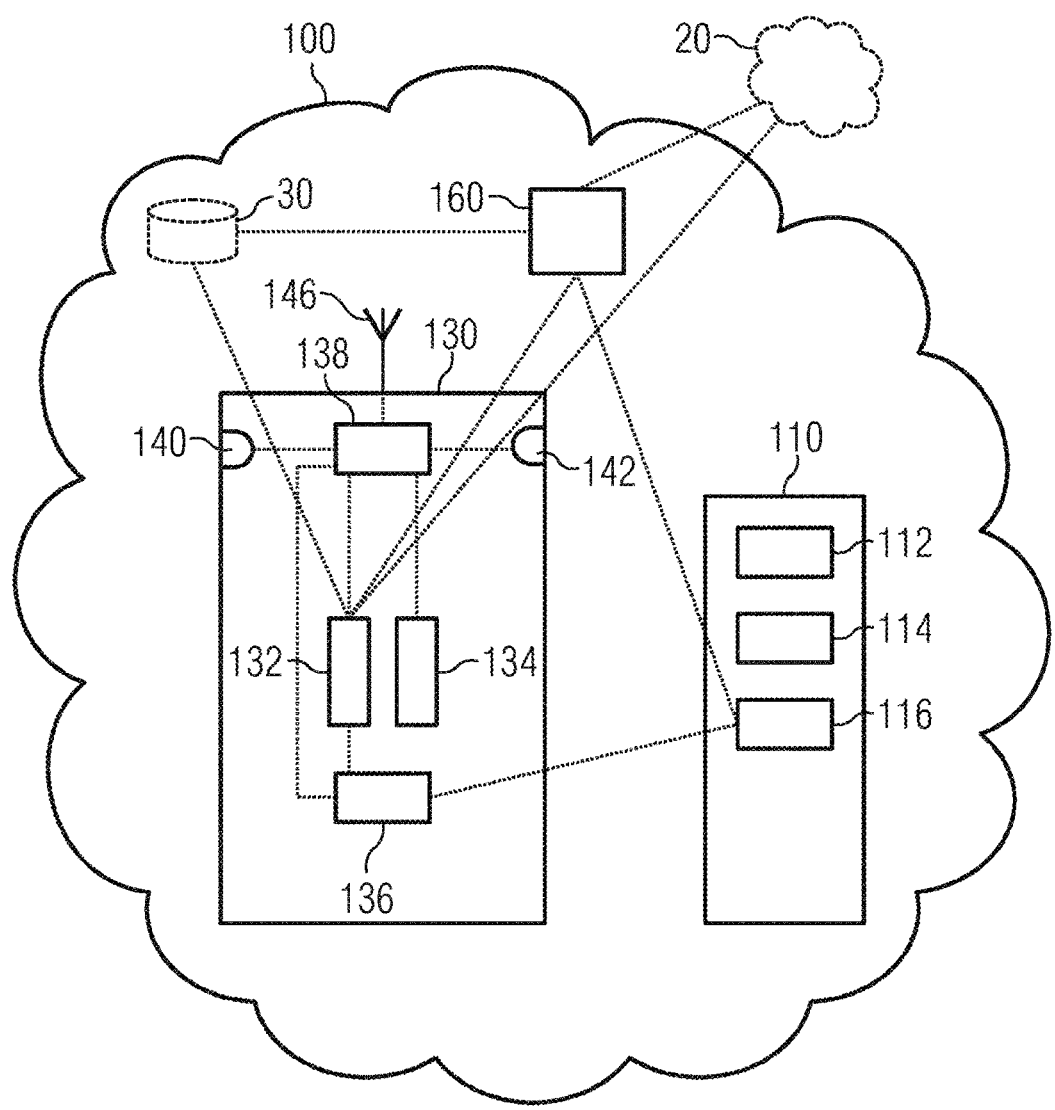
FIG. 2 schematically illustrates a communication system according to an embodiment.

FIG. 2 schematically illustrates a communication system 100 according to an embodiment.

According to an exemplary embodiment, the communication system 100 includes a provider node 110 and a communication node 130. The provider node 110 is according to an embodiment, and may be according to an exemplary embodiment of the provider node 110 given with reference to FIG. 1. The communication node 130 is according to an embodiment, and may be according to an exemplary embodiment of the communication node 130 given with reference to FIG. 1.

The provider node 110 includes a retrieving module 112, a validation module 114, and a deployment module 116. The retrieving module 112 is configured to retrieve a notification signal, wherein the notification signal is indicative of a selected one of a plurality of virtual network functions and at least one customer node (e.g., the customer node 200 of FIG. 1), to which the selected virtual network function is to be provided. The validation module 114 is configured to establish service level agreement data and to validate the service level agreement data, based on the notification signal. The service level agreement data is at least representing a configuration of the selected virtual network function and the at least one customer node. The deployment module 116 is configured to selectively transmit a deployment signal to a communication node depending on the validating of the service level agreement data for providing the selected virtual network function to the at least one customer node. The deployment signal is indicative of the at least one customer node, the selected virtual network function, and its configuration.

In some advantageous modifications, the deployment module 116 may be configured to selectively transmit one or more deployment signals to one or more further communication nodes.

The communication node 130 includes a receiving module 136, which is configured to receive the deployment signal. For this purpose, the receiving module 136 may be configured to establish a data connection to the deployment module 116. Additionally, or alternatively, in some advantageous modifications, the receiving module 136 may indirectly receive the deployment signal from the deployment module 116 by a distributed database, and hence be, in particular, configured to be connected to the distributed database. Accordingly, in such advantageous modifications, the deployment module 116 is configured to be connected to the distributed database and to transmit the deployment signal to the distributed database.

In some advantageous modification and as illustrated in FIG. 2, the communication node 130 may include a retrieving module 132. The retrieving module 132 is configured to retrieve a template of the selected virtual network function from a data repository system. Thereby, the template of the selected virtual network function may be provided by the data repository system and it is not required to permanently store the template locally in the communication node or to transfer the template by the deployment signal or to store it in the distributed database, which may make the deployment of the virtual network function more efficient and/or allow a high flexibility of virtual network functions to be provided.

The communication node 130 further includes a management module 138. The management module 138 is adapted for providing the selected virtual network function by instantiating the selected virtual network function based on the configuration of the virtual network function and—in case the virtual network function requires a template and/or the template of the selected virtual network function is established—also based on the template of the selected virtual network function. For this purpose, the communication node 130 may further include one or more network interfaces 140, 142, 146, which may be implemented for wired or for wireless data connections, and wherein the management module 138 may be internally data connected to the network interfaces.

In some advantageous modifications, the communication node 130 may further include a state reporting module 134. The state reporting module is configured to determine status report data that is indicative of whether the selected virtual network function and according to which configuration the selected virtual network function is provided to the at least one customer node. For this purpose, the state reporting module may be data connected to the management module 138 and/or to one or more of the network interfaces 140, 142, 146. Furthermore, the state reporting module 134 is configured to transmit the status report data to the distributed database. Thereby, the state reporting module 134 may act as a trusted oracle and may facilitate the auditing and/or accounting of the selected virtual network function.

In some advantageous modifications, the communication system 100 further includes a factory node 160. The deployment module 116 is further configured to establish the deployment signal based on the service level agreement data and the template of the selected virtual network function, and to transmit the deployment signal to the communication node 130 and to the factory node 160.

The factory node is configured to retrieve the template of the selected virtual network function from a data repository system 30 and the service level agreement data and validation data from a distributed database 20. In some embodiments, the communication system 100 includes the data repository system 30 and is data connected to the distributed database 20. Alternatively, the communication system may include both, the data repository system 30 and the distributed database 20, or alternatively, the communication system does not include the distributed database or the data repository system but is data connected to both. Furthermore, the factory node 160 is configured to selectively generate a runnable instance of the selected virtual network function depending on the validation data (e.g., if the communication system is able to (physically) provide the selected virtual network function) based on the template and configuration of the selected virtual network function and based on the service level agreement data. Moreover, the factory node is configured to generate a digital signature of the runnable instance and to store the digital signature in the distributed database 20. The digital signature may be a hash value of the runnable instance or may be established by a public/private key signing scheme, wherein the public key may be stored in the distributed database 20 and wherein the private key is used for signing the runnable instance.

In these advantageous modifications, the retrieving module 132 is modified such that it is configured to retrieve the runnable instance from the factory node 160, the distributed database 20, or the data repository system, depending on where the factory node 160 stored the runnable instance. Moreover, the retrieving module 132 is configured to retrieve the digital signature of the runnable instance from the distributed database 20. The management module 138 is modified such that it is configured to validate the runnable instance against the digital signature, and to selectively instantiate the selected virtual network function depending on the validating of the runnable instance. In particular, the runnable instance may include the template and the configuration of the selected virtual network function. Moreover, the management module 138 may validate the runnable instance by a retrieving the public key from the distributed database or from another data storage and by determining, whether the runnable instance has a valid digital signature according to the public key. Alternatively, the management module 138 may also retrieve the hash value from the distributed database 20, compute the hash value of the runnable instance and compare both hash values to validate the runnable instance.

This may beneficially allow to provide, that only valid virtual network functions are provided, whereby hardware of the communication system may be protected and security of the communication system may be enhanced.

In some further modifications, the configuration of the selected virtual network function includes an internal configuration and an interface configuration. In these further modifications, the factory node 160 is configured to generate the runnable instance based on the internal configuration. The management module 138 is configured to instantiate the selected virtual network function based on the runnable instance and additionally the interface configuration. The internal configuration may relate to hardware settings and may describe specific virtual network function internal parameters. These parameters may be important for the proper functioning of the hardware underlying the communication system, e.g., modifying the internal configuration may be harmful for the communication system. The interface configuration may describe how a virtual network function may be connected to a virtual infrastructure of the customer and/or the communication system. The interface configuration may include a definition of number and type of virtual interfaces of the virtual network function and also the way how these interfaces are used. A proper virtual network function interface definition (e.g., interface configuration) provides that the virtual network function is seamlessly connected to the customer's virtual infrastructure and provides correct connectivity.

This may be particularly beneficial, when the runnable instance is a digitally signed, whereby management of (e.g., signed) virtual network functions is facilitated, because customers may change their interface configuration without requiring a new signed runnable instance to be generated. Moreover, the interface configuration and the internal configuration may be updated independently, hence, in particular, the internal configuration may be configured to new hardware of the communication system, without requiring adaption of the interface configuration, which may be supplied by the customer.

For example, the selected virtual network function may be adapted for DHCP with a virtual network function interface configuration defining one virtual interface to be connected to a virtual switch of the customer's virtual infrastructure. By just using the virtual network function interface configuration, the runnable instance may be created and the virtual network function may be started with a standard configuration (e.g., providing DHCP for a standard IP range per virtual tenant network).

For example, the selected virtual network function may be adapted for a firewall with customer specific access and forwarding rules defined in the internal configuration. During the creation process of the runnable instance this internal configuration is applied to the virtual network function. In this case, the virtual network function interface definition may include two virtual interfaces for the customer's infrastructure—an "internal interface" for connecting the internal virtual network space of the user, and the "external interface" connecting a gateway or any other external network segment.

In FIG. 3, a customer node 200 for a data network, the customer node 200 according to an embodiment, is schematically illustrated.

The data network is adapted for providing a plurality of virtual network functions to the customer node by a communication system. The data network and the communication system are each according to an embodiment and may be according to an exemplary embodiment of the data network 10 or the communication system 100 given with reference to FIG. 1 and/or FIG. 2.

In an exemplary embodiment, the customer node 200 includes a selecting module 210, a reporting module 212, and a communication module 240. As illustrated in FIG. 3, the customer node may advantageously further include an obtaining module 202.

In embodiments, in which the customer node 200 includes the obtaining module 202, the obtaining module 202 is configured to receive availability data from a data repository system. The data repository system may be according to an exemplary embodiment of the data network 10 and/or the data repository system 30 given with reference to FIG. 1.

The data repository system is configured to store and to provide one or more virtual network functions. In particular, the data repository system may store configurations and/or templates of the virtual network functions. Moreover, the data repository system may be implemented as a key-value-database, wherein a specific virtual network function (e.g. a configuration and/or a template of it) is retrieved from the database as a value by using a key, which is an identifier of the virtual network function, its configuration or its template. Such a key or identifier may be a hash value of the configuration or the template of the specific virtual network function to be retrieved or a name of this virtual network function. The availability data may also be provided by the data repository system, wherein the availability data is indicative of the virtual network functions being available to the customer node 200.

The selecting module 210 is configured to select one of the plurality of the virtual network functions, (e.g., based on the availability data), as a selected virtual network function. The reporting module 212 is configured to report the selected virtual network function to the distributed database. The communication node 214 is configured to establish a data communication via the selected virtual network function when it is provided by the communication system. For establishing the data communication, the customer node 200 further includes one or more network interfaces 224. The customer node 200 may, in some advantageous modifications, include additional network interfaces 226 for communicating with other computational devices such as computers or production units or production devices.

In some advantageous modifications, the customer node 200 may further include a state reporting module 204. The state reporting module is configured to determine status data which is indicative of whether the selected virtual network function is provided by the communication system to the customer node. Furthermore, the state reporting module 204 is configured to transmit status report data to the distributed database. Thereby, the customer node 200, and in particular the state reporting module 204, may act as a trusted oracle.

FIG. 4 depicts a flowchart of a method for activating a virtual network function of a data network, the method according to an embodiment. The method may be split up, as illustrated in FIG. 4, into a method 300 for operating a customer node 200 and a method 400 for operating a communication system 100. Furthermore, FIG. 4 schematically illustrates a distributed database 20 and a data repository system 30. The communication system 100, the customer node 200, the distributed database 20, and the data repository system 30 are each according to an embodiment and may be according to exemplary embodiments given with reference to the preceding figures.

In an exemplary embodiment, the method 300 includes the method acts 302, 310, 312, and 316 and the condition 314.

In an exemplary embodiment, the method 400 includes the method acts 402, 404, 406, 408, and 414.

In method act 302, at least one virtual network function of one or more virtual network functions stored in the data repository system 30, which is available to the customer node 200, is obtained by receiving availability data from the data repository system 30. Furthermore, in method act 302 this obtained virtual network function is stored in the distributed database 20. In some advantageous modifications, the obtained virtual network function may be purchased by spending a certain amount of a cryptocurrency or by a smart contract implemented by the distributed database 20. Likewise, one or more configurations of a virtual network function or a service level agreement including a virtual network function, one or more configurations of a virtual network function, or a combination thereof may be obtained and purchased.

In method act 310, the obtained virtual network function is selected as a selected virtual network function.

In method act 312, the selected virtual network function is reported to the distributed database 20.

In method act 402, a notification signal is retrieved from the distributed database 20, wherein the notification signal is indicative of the selected virtual network function and at least one customer node, (e.g., customer node 200), to which the selected virtual network function is to be provided. Moreover, in method act 402, a configuration of the selected virtual network function and a template of the selected virtual network function is retrieved from the data repository system 30.

In method act 404, service level agreement data is established, which at least represents the configuration of the selected virtual network function and at least the customer node 200, wherein the establishing is based on the notification signal and additional data, such as the configuration and/or the template of the selected virtual network function. In some advantageous modifications, the additional data may include a physical specification of the communication system 100.

In the optional method act 406, the service level agreement data is validated based on the notification signal. In some advantageous modifications, the communication system 100 may conditionally validate the service level agreement data depending on whether the communication system 100 is (e.g., really/physically) able to provide the selected virtual network function (e.g., by including/being data connected to multiple physical data connections for providing redundancy).

In method act 408, the selected virtual network function is provided to the customer node 200, in particular, according to the configuration of the virtual network function. In some advantageous modifications, the selected virtual network function is provided by instantiating the selected virtual network function based on the template and the configuration of the selected virtual network function.

In method act 414, status report data is established, indicating the provided virtual network function, and is stored in the distributed database 20.

In the method condition 314, it is determined whether the selected virtual network function is provided to the customer node 200 by the communication system 100.

Depending on whether the selected virtual network function is provided to the customer node according to condition 314, in method act 316, a data communication is established via the selected virtual network function.

FIG. 5 depicts a flowchart of a method for deactivating a virtual network function according to an embodiment.

In an exemplary embodiment, the method 500 includes the method acts 502, 504, 506, 508, and 510.

FIG. 5 additionally illustrates a distributed database 20, a customer node 200, and a communication system 100 with a provider node 110 and a communication node 130.

In method act 502, a notification signal indicating a virtual network function to be deactivated is stored in the distributed database 20 by the customer node 200.

In method act 504, the notification signal is retrieved from the distributed database 20 by the provider node 110.

In method act 506, the notification signal is validated, wherein in some advantageous modifications this validation may be further based on additional data retrieved from the distributed database 20.

In method act 508, the provider node 110 sends (e.g., stores) a deployment signal to the distributed database 20, which indicates that the virtual network function is to be deactivated.

In method act 510, the communication node 130 receives the notification signal and stops providing the virtual network function that is to be deactivated.

FIG. 6 depicts a flowchart of a method for initiating and validating a virtual network function of a data network, the method according to an embodiment. The method may be split up, as illustrated in FIG. 6, into a method 300 for operating a customer node 200 and a method 400 for operating a communication system 100. Furthermore, FIG. 6 schematically illustrates a distributed database 20. The communication system 100, the customer node 200, and the distributed database 20 are each according to an embodiment and may be according to exemplary embodiments given with reference to the preceding figures. In some advantageous modifications, the provider node of the communication system 100 may be a validating provider node.

In an exemplary embodiment, the method 300 includes the method act 342.

In an exemplary embodiment, the method 400 includes the method acts 442, 444, 446, and 440 and the method condition 448.

Moreover, in some advantageous modifications, the method 300 and the method 400 also include the acts of the respective methods described with reference to FIG. 4, wherein method act 302 is modified such as to retrieve the availability data as guaranteed availability data from the distributed database 20. Thereby, by the method acts illustrated in FIG. 6 guaranteed availability data is established for the following method acts 302, 310, 312, 402, etc.

In method act 342, a selected one of a plurality of virtual network functions is reported to the distributed database 20 by the customer node 200.

In method act 442, an initial notification signal is retrieved from the distributed database 20 by the communication system 100, wherein the initial notification signal is indicative of the selected one of the plurality of virtual network functions and at least one customer node to which the selected virtual network function is to be provided.

In method act 444, service level agreement data is established (e.g., by a validation module of the communication system), wherein the service level agreement data at least represents a configuration of the selected virtual network function and the at least one customer node.

In method act 446, (e.g., by the validation module of the communication system), validation data is established by validating the service level agreement data against a physical specification of the communication system or a system configuration of the communication system, wherein the system configuration includes the physical specification. The system configuration may be stored in the distributed database 20 or in another data storage. Alternatively, the system configuration or, in particular, the physical specification may also be measured by the communication system, e.g., by testing hardware installed in the communication system. Moreover, the validating may further include validating the service level agreement data against the physical specification and already available or guaranteed available virtual network functions, whose availability is stored in the distributed database 20—e.g., as (guaranteed) availability data and/or as part of the system configuration. Thereby, it may advantageously be provided, that a hardware capacitance and remaining resources of the communication system are not overloaded. This advantageously may allow to guarantee the availability of the selected virtual network function once it has been successfully validated.

At method condition 448, it is determined whether the communication system is capable of satisfying the requirements/expectations of the customer or customer node with regard to physical requirements and/or functional requirements of the communication system, and thus whether the communication system is able to provide the selected virtual network function, in particular as well considering virtual network functions being provided or possibly being provided or being guaranteed to be provided (e.g., readily being guaranteed) by the communication system.

In method act 450, an initial deployment signal is stored in the distributed database 20, if the communication system is (according to method condition 448) able to provide the virtual network function. Therein, the initial deployment signal is being indicative of the service level agreement data and whether the communication system is, according to the system configuration, able to provide the selected virtual network function. Moreover, in some advantageous modifications, it may also be stored in the distributed database 20, if the communication system is (currently) not able to provide the selected virtual network function. This may beneficially enhance auditability and traceability.

In some advantageous modifications, by the initial deployment signal and possibly additional initial deployment signals, which indicate the availability of further virtual network functions and in particular the guaranteed availability, guaranteed availability data may be established and stored in the distributed database (e.g., by the communication system), the guaranteed availability data being indicative of the one or more virtual network functions being guaranteed for one or more customer nodes.

Further embodiments of the disclosure may be described in the following numbered examples.

1. Example: A provider node (110) including: a retrieving module (112) configured to retrieve a notification signal, the notification signal being indicative of a selected one of a plurality of virtual network functions and at least one customer node to which the selected virtual network function is to be provided; a validation module (114) configured to establish service level agreement data, the service level agreement data at least representing a configuration of the selected virtual network function and the at least one customer node, and to validate the service level agreement data, based on the notification signal; and a deployment module (116) configured to selectively transmit a deployment signal to a communication node depending on the validating of the service level agreement data for providing the selected virtual network function to the at least one customer node, the deployment signal being indicative of the at least one customer node, the selected virtual network function, and its configuration.

2. Example: The provider node (110) of Example 1, wherein the retrieving module (112) is configured to retrieve at least one of the notification signal and the service level agreement data from a distributed database (20).

3. Example: The provider node (110) of Example 2, wherein the retrieving module (112) is further configured to retrieve, from the distributed database (20), at least one of the configuration of the selected virtual network function and a template of the selected virtual network function.

4. Example: The provider node (110) of any one of the preceding numbered Examples, wherein the retrieving module (112) is further configured to retrieve, from a data repository system (30), at least one of the configuration of the selected virtual network function and a template of the selected virtual network function.

5. Example: The provider node (110) of Example 3 or 4, wherein the validation module (114) is configured to validate the service level agreement data based on the notification signal and the template of the selected virtual network function.

6. Example: The provider node (110) of any one of the Examples 3 to 5, wherein the deployment module (116) is configured to establish the deployment signal based on the service level agreement data and the template of the selected virtual network function.

7. Example: A communication node (130) including: a receiving module (136) configured to receive a deployment signal indicative of at least one customer node, a selected one of a plurality of virtual network functions, and a configuration of the selected virtual network function; and a management module (138) configured to provide the selected virtual network function according to its configuration to the at least one customer node.

8. Example: The communication node (130) of Example 7, further including: a state reporting module (134) configured to determine status report data, the status report data being indicative of whether the selected virtual network function and according to which configuration is provided to the at least one customer node, and to transmit the status report data to a distributed database (20).

9. Example: The communication node (130) of Example 7 or 8, further including a retrieving module (132); wherein: the retrieving module (132) is configured to retrieve a template of the selected virtual network function from a data repository system (30); and the management module (138) is adapted, for providing the selected virtual network function, to instantiate the selected virtual network function based on the template and the configuration of the selected virtual network function.

10. Example: A communication system (100) including the provider node (110) of any one of Examples 1 to 6 and the communication node (130) of any one of Examples 7 to 9.

11. Example: A customer node (200) for a data network (10), wherein the data network (10) is adapted for providing a plurality of virtual network functions to the customer node by a communication system (100); the customer node including (200): a selecting module (210), configured to select one of the plurality of virtual network functions as a selected virtual network function; a reporting module (212), configured to report the selected virtual network function to a distributed database (20); and a communication module (214), configured to establish a data communication via the selected virtual network function, when it is provided by the communication system.

12. Example: The customer node (200) of Example 11, further including an obtaining module (202), the obtaining module being configured to receive availability data from the distributed database (20) or a data repository system (30), the availability data being indicative of the one or more virtual network functions being available to the customer node.

13. Example: The customer node (200) of Example 11 or 12, further including a state reporting module (204), wherein the state reporting module is configured to determine status report data, the status report data being indicative of whether the selected virtual network function is provided by the communication system (100) to the customer node, and to transmit the status report data to the distributed database (20).

14. Example: A method (300) for operating a customer node (200) for a data network (10), wherein the data network is adapted for providing a plurality of virtual network functions to the customer node by a communication system (100), the method including: (310) selecting one of the plurality of virtual network functions as a selected virtual network function; (312) reporting the selected virtual network function to a distributed database; and (316) establishing a data communication via the selected virtual network function, when (314) it is provided by the communication system.

15. Example: A method (400) for providing a plurality of virtual network functions to a customer node by a communication system (100), wherein the method includes: (402) retrieving a notification signal, the notification signal being indicative of a selected one of the plurality of virtual network functions and at least one customer node to which the selected virtual network function is to be provided; (404) establishing service level agreement data, the service level agreement data at least representing a configuration of the selected virtual network function and the at least one customer node, based on the notification signal; (406) validating the service level agreement data based on the notification signal; and (408) providing the selected virtual network function according to its configuration to the at least one customer node.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A provider node implemented in hardware, wherein the provider node is a component of a communication system, and wherein the provider node is configured to:
   retrieve a notification signal, the notification signal being indicative of a selected virtual network function of a plurality of virtual network functions and at least one customer node to which the selected virtual network function is to be provided;
   retrieve, from a trusted database or a data repository system, a configuration of the selected virtual network function and a template of the selected virtual network function;
   establish service level agreement data representing the configuration of the selected virtual network function and the at least one customer node;
   establish validation data by validating the service level agreement data against a physical specification of the communication system and already available or guaranteed available virtual network functions stored in the trusted database, therein preventing the communication system from being overloaded and guaranteeing availability of the selected virtual network function upon successful validation;
   establish a deployment signal based on the service level agreement data and the template of the selected virtual network function; and
   transmit the deployment signal to a communication node for providing the selected virtual network function to the at least one customer node based on the validation data,
   wherein the configuration of the selected virtual network function comprises an internal configuration and an interface configuration,
   wherein a runnable instance of the selected virtual network function is generated based on the internal configuration,
   wherein selected virtual network function is instantiated by the communication node based on the runnable instance and the interface configuration, and
   wherein the internal configuration and the interface configuration are independently updatable.

2. The provider node of claim 1, wherein the provider node is further configured to retrieve the notification signal from the trusted database.

3. The provider node of claim 1, wherein the trusted database is a distributed database, and
   wherein the provider node is further configured to retrieve the configuration of the selected virtual network function from the distributed database and the template of the selected virtual network function from the data repository system.

4. The provider node of claim 1, wherein the provider node is further configured to establish the validation data by validating the service level agreement data based on the notification signal,
   wherein the notification signal is further indicative of hardware requirements and functional parameters for the providing of the selected virtual network function, and
   wherein the provider node is further configured to selectively transmit the deployment signal depending on the validation data.

5. The provider node of claim 1, wherein the physical specification of the communication system is measured by testing hardware installed in the communication system.

6. The provider node of claim 1, wherein the provider node is configured to store the selected virtual network function in the trusted database when the communication system is currently not able to provide the selected virtual network function.

7. A communication node implemented in hardware, wherein the communication node is configured to:
   receive a deployment signal indicative of at least one customer node, a selected virtual network function of a plurality of virtual network functions, a configuration of the selected virtual network function, and a template of the selected virtual network function; and
   instantiate the selected virtual network function based on the template and the configuration of the selected virtual network function to provide the selected virtual network function according to the configuration to the at least one customer node,
   wherein the deployment signal is received based on validation data of service level agreement data against a physical specification of a communication system and already available or guaranteed available virtual network functions stored in a trusted database, therein preventing the communication system from being overloaded and guaranteeing availability of the selected virtual network function upon successful validation, and
   wherein the configuration of the selected virtual network function comprises an internal configuration and an interface configuration,
   wherein a runnable instance of the selected virtual network function is generated based on the internal configuration,
   wherein selected virtual network function is instantiated by the communication node based on the runnable instance and the interface configuration, and
   wherein the internal configuration and the interface configuration are independently updatable.

8. The communication node of claim 7, wherein the communication node is further configured to:
   determine status report data, the status report data being indicative of whether the selected virtual network function and according to which configuration is provided to the at least one customer node, and
   transmit the status report data to the trusted database.

9. The communication node of claim 7, wherein the communication node is further configured to retrieve the template of the selected virtual network function from a data repository system.

10. A communication system comprising:
    a provider node implemented in hardware, wherein the provider node is configured to:
    retrieve a notification signal, the notification signal being indicative of a selected virtual network function of a plurality of virtual network functions and at least one customer node to which the selected virtual network function is to be provided;

retrieve, from a trusted database or a data repository system, a configuration of the selected virtual network function and a template of the selected virtual network function;

establish service level agreement data representing the configuration of the selected virtual network function and the at least one customer node;

establish validation data by validating the service level agreement data against a physical specification of the communication system and already available or guaranteed available virtual network functions stored in the trusted database, therein preventing the communication system from being overloaded and guaranteeing availability of the selected virtual network function upon successful validation;

establish a deployment signal based on the service level agreement data and the template of the selected virtual network function; and transmit the deployment signal to a communication node for providing the selected virtual network function to the at least one customer node based on the validation data; and the communication node implemented in hardware, wherein the communication node is configured to:

receive the deployment signal indicative of at least one customer node, the selected virtual network function of the plurality of virtual network functions, the configuration of the selected virtual network function, and the template of the selected virtual network function; and instantiate the selected virtual network function based on the template of the selected virtual network function and the configuration of the selected virtual network function to provide the selected virtual network function according to the configuration to the at least one customer node; and wherein the communication system is configured to retrieve the template of the selected virtual network function from the data repository system and the configuration of the selected virtual network function, the service level agreement data, an indication of the selected virtual network function, an indication of the communication node, and an indication of the at least one customer node from the trusted database, wherein the communication system is further configured to generate a runnable instance of the selected virtual network function based on the template and configuration of the selected virtual network function, the indication of the selected virtual network function, the at least one customer node and the communication node, and the service level agreement data, wherein the communication node is further configured to retrieve the runnable instance, wherein the communication node is further configured to instantiate the selected virtual network function based on the runnable instance, wherein the configuration of the selected virtual network function comprises an internal configuration and an interface configuration, wherein the runnable instance of the selected virtual network function is generated based on the internal configuration, wherein selected virtual network function is instantiated by the communication node based on the runnable instance and the interface configuration, and wherein the internal configuration and the interface configuration are independently updatable.

11. The communication system of claim 10, wherein the provider node is further configured to store the validation data in the trusted database, and wherein the communication system is further configured to selectively generate the runnable instance depending on the validation data.

12. The communication system of claim 10, wherein the communication system is further configured to generate a digital signature of the runnable instance and to store the digital signature in the trusted database, wherein the communication node is further configured to retrieve the digital signature of the runnable instance from the trusted database, and wherein the communication node is further configured to validate the runnable instance against the digital signature and selectively instantiate the selected virtual network function depending on the validating of the runnable instance.

13. A customer node for a data network, wherein the data network is configured for providing a plurality of virtual network functions to the customer node by a communication system, wherein the customer node is implemented in hardware and configured to:

receive availability data from a trusted database or a data repository system, the availability data being indicative of one or more virtual network functions of the plurality of virtual network functions being available to the customer node;

select an available virtual network function as a selected virtual network function;

receive the selected virtual network function from the communication system, wherein the selected virtual network function is based on a template of the selected virtual network function and a configuration of the selected virtual network function;

report the selected virtual network function to a distributed database; and establish a data communication via the selected virtual network function, when provided by the communication system following a validation of service level agreement data against a physical specification of the communication system and already available or guaranteed available virtual network functions stored in the trusted database, therein preventing the communication system from being overloaded and guaranteeing availability of the selected virtual network function upon successful validation, wherein the configuration of the selected virtual network function comprises an internal configuration and an interface configuration, wherein a runnable instance of the selected virtual network function is generated based on the internal configuration, wherein selected virtual network function is instantiated by a communication node based on the runnable instance and the interface configuration, and wherein the internal configuration and the interface configuration are independently updatable.

14. A method for operating a customer node for a data network, wherein the data network is configured for providing a plurality of virtual network functions to the customer node by a communication system, the method comprising:

receiving availability data from a trusted database or a data repository system, the availability data being indicative of one or more virtual network functions of the plurality of virtual network functions being available to the customer node;

selecting a virtual network function of the one or more virtual network functions available according to the availability data as a selected virtual network function;

receiving the selected virtual network function from the communication system, wherein the selected virtual network function is based on a template of the selected virtual network function and a configuration of the selected virtual network function;

reporting the selected virtual network function to a distributed database; and establishing a data communication via the selected virtual network function, when provided by the communication system following a validation of service level agreement data against a physical specification of the communication system and already available or guaranteed available virtual network functions stored in the trusted database, therein preventing the communication system from being overloaded and guaranteeing availability of the selected virtual network function upon successful validation, wherein the configuration of the selected virtual network function comprises an internal configuration and an interface configuration, wherein runnable instance of the selected virtual network function is generated based on the internal configuration, wherein the selected virtual network function is instantiated by a communication node based on the runnable instance and the interface configuration, and wherein the internal configuration and the interface configuration are independently updatable.

15. A method for providing a plurality of virtual network functions to a customer node by a communication system, the method comprising:

retrieving a notification signal, the notification signal being indicative of a selected virtual network function of the plurality of virtual network functions and at least one customer node to which the selected virtual network function is to be provided;

retrieving, from a trusted database or a data repository system, a configuration of the selected virtual network function and a template of the selected virtual network function;

establishing service level agreement data, the service level agreement data at least representing the configuration of the selected virtual network function and the at least one customer node, based on the notification signal;

validating the service level agreement data against a physical specification of the communication system and already available or guaranteed available virtual network functions stored in the trusted database, therein preventing the communication system from being overloaded and guaranteeing availability of the selected virtual network function upon successful validation; and providing the selected virtual network function by instantiating the selected virtual network function based on the template and the configuration of the selected virtual network function, wherein the configuration of the selected virtual network function comprises an internal configuration and an interface configuration, wherein a runnable instance of the selected virtual network function is generated based on the internal configuration, wherein the selected virtual network function is instantiated by a communication node based on the runnable instance and the interface configuration, and wherein the internal configuration and the interface configuration are independently updatable.

* * * * *